Nov. 10, 1964 W. R. WOLFE, JR 3,156,587
PRIMARY CELLS
Filed Dec. 10, 1962
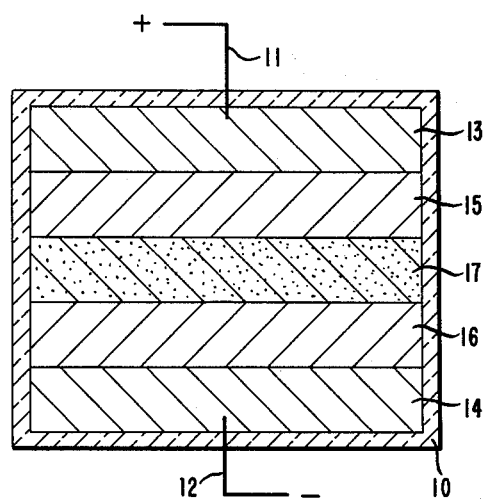
INVENTOR
WILLIAM R. WOLFE, JR.
BY *James H. Ryan*
ATTORNEY 3,156,587
Patented Nov. 10, 1964

3,156,587
PRIMARY CELLS
William R. Wolfe, Jr., Wilmington, Del., assignor to E. I. du Pont de Nemours and Company, Wilmington, Del., a corporation of Delaware
Filed Dec. 10, 1962, Ser. No. 243,495
5 Claims. (Cl. 136—100)

This invention relates to, and has as its principal object provision of, aqueous primary voltaic cells containing, as an anodic component, an organic compound having at least one ethylenic group, one carbon atom of which is attached to at least one tertiary amino nitrogen atom.

In accordance with the present invention, it has now been discovered that certain ethylenically unsaturated compounds, which are characterized by the fact that they contain at least one tertiary amino nitrogen atom directly attached to ethylenic carbon atom, behave as anodic substances and act as sources of electrochemical energy when used in the anodes of otherwise largely conventional primary voltaic cells. These aminoethylene compounds are further characterized by being stable in the presence of aqueous inorganic salt electrolytes, by having molecular weights preferebaly below about 650, and by having at least one pair of ethylenic carbon atoms per molecule. Either by themselves or in combination with other known materials as the anode in a primary voltaic cell, these compounds exhibit a capacity to serve as a source of electromotive force.

The invention is further understood by reference to the attached drawing which represents schematically a section of a dry-cell battery based on the principles of the present invention. In this drawing is shown a container 10 of glass or other conventional material through which penetrate leads 11 and 12 connected to electrodes 13 and 14. The cathode 13 is of platinum or other inert conductive material. The anode 14 is platinum, silver or other conductor. Layer 15 is the cathode mix, i.e., oxidizing substance such as mercuric oxide, with conductor such as graphite, and electrolyte. Layer 16 is the anodic compartment containing an ethylenically unsaturated compound having tertiary amino nitrogen attached to ethylenic carbon, conductor such as graphite and electrolyte. Layer 17 is a permeable separator of porous material.

It will be noted that the cells of this invention are denominated "aqueous" and the compounds, "stable." The term "aqueous" implies only that sufficient water is present to permit mobility of the ions of the electrolyte used. Inert organic solvents, e.g., acetonitrile, may, and usually will, be present in addition to water. The term "stable" means that no chemical reaction takes place when the compound is admixed with aqueous inorganic salt in the absence of electrical current at temperatures employed, e.g., 0–40° C.

While the tertiary aminoethylenic compounds now employed will usually have molecular weights of not greater than 650, certain higher molecular weight materials having tertiary amino groups bound to ethylenic carbon atoms as described have value as sources of electromotive force and are within the spirit and scope of this invention. Those compounds having molecular weights of below 360 are preferred. Tertiary aminoethylenic compounds will usually have molecular weights greater than about 100. Preferably, these compounds have four amino groups and one ethylenic group per molecule. By tertiary amino is meant this nitrogen has no hydrogen directly bonded to it, i.e., the nitrogen is bonded to three different carbons.

Thus, the novel anodic material, i.e., the substance supplying the electrons to the external circuit, useful in this invention is an aminoethylenic compound wherein the tertiary amino nitrogen is directly attached to a carbon atom doubly bonded to a further carbon atom, as shown:

(1) 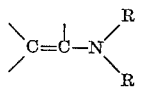

One class of particularly useful and active tertiary aminoethylenic compounds particularly useful in this invention is represented by the formula (2) 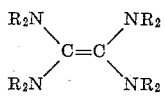

wherein the R's, which can be alike or different, and taken pairwise on individual or adjacent nitrogens, can be joined together to form a ring of no more than 8 ring members, represent monovalent, aliphatically saturated hydrocarbyl and oxa- and azahydrocarbyl radicals of 1–10 chain members, preferably alkyl and generally of no more than 5 carbons each, and preferably of no more than 3, with a preferred total carbon content of the molecule of no more than 26.

Illustrative usable anoidic materials include well-known compounds such as 1,2-bis(dimethylamino)ethylene, 1-dimethylamino-1,2,2-trichloroethylene, 1-dimethyl-amino-1-heptene, 1-di-n-amylamino-2-phenylethlene, 1-dimethylamino-2,2-cyclopentamethyleneethylene, i.e., N, N-dimethylcyclohexylidenemethylamine, and the like.

An especially preferred class of compounds useful in this invention is the tetrakis(dialkylamino)ethylenes of which the first member, tetrakis(dimethylamino)ethylene (TMAE) is described by Pruett et al., J. Am. Chem. Soc. 72, 3646 (1950). Suitable further compounds of this class are:

tetrakis(diethylamino)ethylene,
tetrakis(ethylmethylamino)ethylene,
tetrakis(N-piperidino)ethylene,
tetrakis(N-pyrrolidinyl)ethylene,
tetrakis(morpholino)ethylene,
tetrakis[N-(N'-methyl)piperazinyl]ethtylene,
tetrakis(dimethylaminomethyleneamino)ethylene,
1,1',3,3'-tetramethyl-$\Delta^{2,2'}$-bi(imidazolidine),
1,1',3,3'-tetraethyl-$\Delta^{2,2'}$-bi(imidazolidine),
1,3'-diethyl-1',3-dimethyl-$\Delta^{2,2'}$-bi(imidazolidine),
1,1',3,3'-tetramethyl-$\Delta^{2,2'}$-bi(hexahydropyrimidine), and the like.

In this application the term "tetrakis(dialkylamino)-ethylenes" is not restricted to those compounds having two discrete, i.e., separate, alkyl (including cycloalkyl) substituents on each amino nitrogen, but extends to those compounds wherein two substituents on individual or adjacent nitrogens are embodied in a single divalent radical, making with the amino nitrogen a monoaza, diaza, and/or oxa/aza heterocycle of from three to seven total ring members wherein any substituents on ring members are solely saturated hydrocarbon of no more than eight carbons each. Thus, the term describes not only the simple tetrakis(dialkylamino)ethylenes but also the more complicated structures wherein substituents on individual or adjacent amino nitrogen are together joined pairwise, either directly or through intervening heterocyclic oxa or aza members.

Salts of the above tertiary amino ethylenes are also useful in the formulation of primary cells. However, salts have more rapid mobility and are generally not preferred where stable batteries of long shelf life are desired. Salts included are those of alkyl chlorides, as well as of organic and inorganic acids. Use of salts with aqueous electrolytes are of particular interest where the electrolyte is added just before use of the cell, e.g., as in a reserve cell.

The amino ethylenes are generally stable at elevated temperatures and under the general conditions present in the cell except for electrochemical reactions.

Except for the use of the novel anodic material described in this invention, primary voltaic cells containing this material are of conventional design and manufacture.

Although anodes employing the novel material of this invention can be coated with such tertiary aminoethylenic compound, it is preferred that a conductor be impregnated with it or formulated in some fashion, such as mixing with graphite and electrolyte. In the anodes or anodic composition of this invention, the above-defined amino compounds constitute generally between 1:5 and 5:1 ratio by weight of the total anodic material, i.e. conductor, electrolyte, and amino compound.

Using these anodes, one prepares the primary voltaic cell in conventional manner except for the use of the previously-mentioned amino compound as an essential constituent in the anodic portion.

The novel feature is in the presence of said amino compounds in the anodic compartment whereby electrons are supplied to the external circuit by chemical reaction of the compound. The compound is adjacent to a conductor of electric current, e.g., inert metal or graphite. The cathodic compartment can contain as the depolarizer metal oxides such as mercuric oxide, manganese dioxide, lead dioxide, silver chloride, copper oxides, organic compounds such as dinitrobenzenes, hexachloromelamine, or polycyanoethylenes such as tetracyanoethylene. Conventional separators, diaphragms, inorganic salt electrolytes, inert conductors (such as graphite) are generally used. Inhibitors or anticorrosive agents can also be present.

The following nonlimiting examples further illustrate primary voltaic cells containing amino ethylenic compounds as the anodic material.

*Example I*

A primary cell based on TMAE, i.e., tetrakis(dimethylamino)ethylene, was constructed as follows: An anode was formed from a mixture of TMAE added to dry acetonitrile which, in turn, was mixed with graphite and the electrolyte (sodium hydroxide). The anode mix was compressed on a platinum metal electrode. The cathode mix was a mixture of mercuric oxide and graphite made into a stiff paste using the electrolyte. The electrolyte was made from 0.1 NaOH (aqueous) which was deaerated by refluxing in a nitrogen atmosphere. This was mixed with an equal volume of dry acetonitrile. A filter paper was used as the separator. The cell delivered an open circuit voltage of 0.43 volt and delivered 86–100 ma. into a 2.5-ohm load and 100–250 ma. into a 0.5-ohm load.

*Example II*

Another primary cell based on TMAE was constructed in much the manner described in Example I. The anode mix was composed of TMAE and graphite made into a thick paste by mixing with the electrolyte (a mixture of acetonitrile, ammonium chloride, and water). The paste was compressed onto a platinum metal plate. The cathode was silver plate which was coated with a coherent coating of silver chloride. Using as a separator a piece of filter paper saturated with the electrolyte (acetonitrile, ammonium chloride, and water), a cell voltage of 0.7 volt was obtained. The cell delivered 80 ma. into a 2.5-ohm load.

As noted above, the first member of the large class of tetrakis(dialkylamino)ethylenes which represent the preferred anodic components of this invention, i.e., TMAE, is an extremely reactive and peculiar compound which can be prepared in excellent yield by the direct interaction between chlorotrifluoroethylene and dimethylamine in the manner of Pruett et al. J. Am. Chem. Soc. 72, 3646 (1950). None of the rest of the class of the tetrakis(dialkylamino)ethylenes, even including the first next adjacent methylene homolog, i.e., tetrakis(diethylamino)-ethylene, can be made by this technique substituting the requisite different secondary amine.

The other tetrakis(dialkylamino)ethylenes can be prepared by the interaction between the requisite secondary amine and the hydrocarbon amide acetals, which may also be described as disubstituted aminodihydrocarbyloxymethanes, preferably those of relatively short chain length. This interaction between the requisite secondary amine and amide acetal intermediates, i.e., the disubstituted amino-1,1-dihydrocarbyloxymethanes, is basically a substitution or substitution/condensation reaction in which the entering secondary amine moiety is substituted for the disubstituted amino moiety of the amide acetal and also for one of the hydrocarbyloxy moieties of the amide acetal and with ultimate splitting out of another molecule of the hydroxyhydrocarbyl compound and resultant dimerization to the formation of the desired tetrakis(dialkylamino)ethylene, all in accord with the following stoichiometry:

(1) $R_2NCH(OR')_2 + R_2''NH \longrightarrow R_2''NCH(OR')_2 + R_2NH$ (2) $R_2''NCH(OR')_2 + R_2''NH \longrightarrow (R_2''N)_2CHOR' + R'OH$ (3) 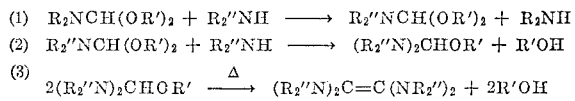

wherein the R's, which can be alike or different, are monovalent alkyl or cycloalkyl radicals, generally of no more than eight carbons each, which can be joined together to form with the intervening nitrogen a heterocycle of from three to seven ring members; the R' 's which can also be alike or different, or joined together, are monovalent alkyl, aryl, aralkyl, alkaryl, or cycloalkyl radicals and, when together joined, form with the two oxygens and intervening carbon a 1,3-dioxaheterocycle of from five to seven ring members; and the R" 's which can also be alike or different or joined together pairwise on the same or different nitrogens, are monovalent alkyl or cycloalkyl hydrocarbon or oxa- and/or azahydrocarbon radicals of no more than eight carbons each. In any event, when the two R" 's are joined together, they form with the indicated amine nitrogen a monoazacarbocycle, an oxaazacarbocycle, or a diazacarbocycle of from three to seven ring members.

Because of easier conversion to the desired tetrakis-(dialkylamino)ethylenes, preferred are short chain hydrocarbon amide acetals wherein the radicals pendent on the nitrogen and the two oxy oxygens are short chain, saturated hydrocarbon, and oxa- and azahydrocarbon radicals of no more than six chain or ring members each. The best amide acetal intermediate is the one where all such radicals are the shortest, viz., 1,1-dimethoxydimethylamine, i.e., the dimethyl acetal of N,N-dimethylformamide. The reaction is effected simply by mixing the two coreactants, generally with the secondary amine in excess, and heating to drive off the hydroxyhydrocarbyl compound, i.e., alcohol or phenol, and amine formed in accord with the foregoing stoichiometry. The resulting substituted secondary amine corresponding to the secondary amino moiety of the amide acetal coreactant will be removed by distillation as the reaction proceeds, as will any resulting alcohol or phenol, through the condensation substitution of the second disubstituted amino fragment from the entering secondary amine for one of the hydrocarbyloxy fragments of the amide acetal.

The final dimerization step is effected substantially solely thermally, and in order to insure maximum yield of the desired tetrakis(dialkylamino)ethylenes, the reaction will finally be carried out in the temperature range 125–250° C., except in those instances where short-chain diamines are the entering secondary amines, resulting in the formation of cyclic tetrakis-substituted aminoethylenes, in which instance reaction temperatures need not normally be carried much above the 80–125° C. range.

The reaction is an easy one to carry out, requiring only that the necessary two coreactants be brought together and heated. To avoid possible side reactions and other complicating factors, the reaction is normally carried out in a dry, inert atmosphere, e.g., dry $N_2$. The substituted secondary amine corresponding to the disubstituted amino moiety of the starting amide acetal coreactant will normally be removed by simple distillation. This disubstituted amine will usually be sufficiently low boiling that it can be permitted to vent as a gas through the reflux condenser of the distillation head normally used. The alcohol or phenol resulting from the condensation reaction between a second molar proportion of the entering secondary amine and one of the hydrocarbyloxy moieties of the amide acetal coreactant will normally be condensed and removed as a liquid distillate as formed.

While no reaction solvent at all is required, for ease and convenience it may sometimes be desirable to use an inert hydrocarbon or hydrocarbon ether in excess to assure good contact between the two coreactants. Since many of the lower alcohols form azeotropes with various of the hydrocarbon solvents, it frequently develops that the alcohol/hydrocarbon solvent azeotrope simply is distilled from the reaction mixture, and when azeotrope formation ceases, the reaction for the formation of the bis-(disubstituted amino)hydrocarbyloxymethane is substantially complete. Under such conditions, i.e., using an inert solvent, the reaction mixture normally will not reach the temperatures necessary for the formation of the tetrakis(disubstituted amino)ethylenes except, as mentioned before, for the diamines and resultant cyclic aminoethylenes. For the tetrasubstituted products, either no reaction diluent is used and the reaction is driven to completion solely thermally, or for convenience, an inert reaction solvent is used and the reaction driven to completion therewith to the formation of the bis(disubstituted amino)hydrocarbyloxymethane. The reaction diluent will then be removed by distillation and the tetrakis(disubstituted amino)ethylene formed by further heating of the bis(disubstituted amino)hydrocarbyloxymethane.

The requisite amide acetal intermediates can be prepared by the method of Meerwein, Angew. Chem. 71, 530 (1959), by reaction between a hydrocarbon ether, a hydrocarbyl fluoride, and silver fluoborate to form a trihydrocarbyloxonium fluoborate which is then reacted with the requisite N,N-dihydrocarbyl-substituted carboxamide to form the intermediate oxonium fluoborate derivative of the amide, i.e., an α-(N,N-dihydrocarbylamino)-α-(hydrocarbyloxy)hydrocarbonium fluoborate, which is subsequently further reacted with an alkali metal alcoholate to form the desired amide acetal and, as a coproduct, the alkali metal fluoborate. Also, as disclosed in the same reference, the intermediate higher amide acetals can be prepared by alcohol exchange with the lower amide acetals in accord with the following stoichiometry:

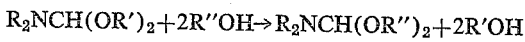

where R″ is of greater carbon content than R′.

In view of the innate complexity of the silver fluoborate synthesis, the latter, i.e., the alcohol exchange route, will, for reasons of convenience, generally be preferred. Thus, the silver fluoborate synthesis will normally be used to prepare the first member of the series, i.e., the dimethyl acetal of N,N-dimethylformamide, which will then be used in alcohol exchange to prepare any desired higher hydrocarbyloxy amide acetals. The same generally applies to any desired higher hydrocarbylamino amide acetals in which an amine exchange reaction in accord with the following stoichiometry will serve to prepare any desired higher hydrocarbylamino amide acetals:

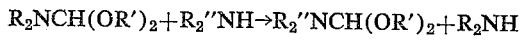

where R′ is of greater carbon content than R.

In both these alcohol and amine exchange reactions, the cyclic products can also be obtained, i.e., by the use of a glycol to obtain the cyclic hydrocarbyloxy moiety or by use of a cyclic secondary amine to obtain the cyclic amino moiety of the amide acetals.

The preferred method of preparing the necessary intermediate amide acetals involves the reaction of an alkali metal or alkaline earth metal salt of the desired alcohol or phenol with the requisite α,α-dihalosubstituted tertiary amine in accord with the following stoichiometry:

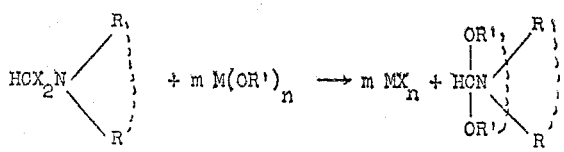

wherein the R's, which can be alike or different, are monovalent alkyl or cycloalkyl radicals of not more than 8 carbons each, which can be joined together to form a saturated monoaza, diaza, or oxaza heterocycle of 3–7 ring members; the X's, which can be alike or different, are halogens of atomic No. from 9–35; M is an alkali metal or an alkaline earth metal; R′ is a monovalent alkyl, aryl, aralkyl, alkaryl, or cycloalkyl radical of no more than 8 carbons; and m and n are integers from 1–2, inclusive, depending on the valence of the metal M and such that $m+n=3$. When n is 2, the R′ radicals can be together joined to form with the intervening carbon and two oxygens a 1,3-dioxacarbocycle of 5 to 7 ring members.

In addition to the aforesaid new tetrakis(disubstituted amino)ethylenes and the necessary amide acetal and secondary amine coreactants given in the foregoing detailed examples, other such coreactants of these same generic types can be so similarly used to give still further aminoethylenes useful in the present invention. Thus, there can be used such other formamide acetals as N-(dimethoxymethyl) - N - methyl-n-octylamine, N-diethoxymethyldiisobutylamine, N-diethoxymethyl-N-ethyl-p-toluidine, N-diethoxymethylpyrrolidine, N - diisopropoxymethylmorpholine, and the like. In preparing the new tetrakis-(disubstituted amino)ethylenes there can be used such cyclic secondary amines as ethyleneimine, i.e., aziridine, azetidine, i.e., azacyclobutane, perhydroazepine, Δ³-pyrroline, i.e., 2,5-dihydroazoline, 1,2,2-trimethylhydrazine, and the like. Reaction of these additional amine species with the dimethyl acetal of N,N-dimethylformamide results, respectively, in the formation of the following tetrakis(cyclic and acyclic disubstituted amino)ethylenes:

1,1,2,2-tetrakis(1-aziridinyl)ethylene,
1,1,2,2-tetrakis(1-azetidinyl)ethylene,
1,1,2,2,-tetrakis(1-hexahydroazepinyl)ethylene,
1,1,2,2-tetrakis(1-2,5-dihydroazolinyl)ethylene,
i.e., 1,1,2,2-tetrakis(1-Δ³-pyrrolinyl)ethylene,
1,1,2,2-tetrakis[1-(1,2,2-trimethylhydrazinyl)]ethylene, and the like.

It will be understood that modifications can be made to obtain desired cell characteristics, e.g., by selection of specific depolarizer, combination of cells in series, etc.

Since obvious modifications and equivalents in the invention will occur to those skilled in the electro-chemical art, I propose to be bound solely by the appended claims.

The embodiments of the invention in which an exclusive property or privilege is claimed are defined as follows:

1. A primary voltaic cell whose anode contains as an essential component for supplying electrons to the external circuit an organic ethylenically unsaturated compound containing at least one tertiary amino nitrogen atom directly attached to an ethylenic carbon atom.

2. A primary voltaic cell whose anode contains as an essential component for supplying electrons to the external circuit an organic ethylenically unsaturated compound containing at least one tertiary amino nitrogen atom directly attached to an ethylenic carbon atom, such organic compound being further characterized by being stable in the presence of aqueous inorganic salt electrolytes, by having a molecular weight below about 650, and by having at least one pair of ethylenic carbon atoms per molecule.

3. A primary voltaic cell whose anode contains tetrakis(dimethylamino)ethylene as an essential component for supplying electrons to the external circuit.

4. A paste for use in a primary voltaic cell comprising (1) an organic ethylenically unsaturated compound containing at least one tertiary amino nitrogen atom directly attached to an ethylenic carbon atom and (2) graphite, said paste being compounded with water.

5. A paste for use in a primary voltaic cell comprising (1) tetrakis(dimethylamino)ethylene and (2) graphite, said paste being compounded with water.

References Cited in the file of this patent
UNITED STATES PATENTS

| | | |
|---|---|---|
| 2,897,250 | Klopp | July 28, 1959 |
| 3,110,630 | Wolfe | Nov. 12, 1963 |